United States Patent [19]

Shimano

[11] 4,335,628
[45] Jun. 22, 1982

[54] PEDAL FOR A BICYCLE
[75] Inventor: Keizo Shimano, Sakai, Japan
[73] Assignee: Shimano Industrial Company Limited, Osaka, Japan
[21] Appl. No.: 166,784
[22] Filed: Jul. 8, 1980
[30] Foreign Application Priority Data
  Jul. 23, 1979 [JP] Japan .......................... 54-102174[U]
[51] Int. Cl.³ .............................................. G05G 1/14
[52] U.S. Cl. ...................................... 74/594.4; 74/560
[58] Field of Search ............................... 74/594.4, 560
[56] References Cited
U.S. PATENT DOCUMENTS
  439,779 11/1890 Hoyt ................................... 74/594.4
FOREIGN PATENT DOCUMENTS
  1043447 10/1951 France ............................... 74/594.4
     3608 of 1890 United Kingdom ............... 74/594.4
   338563 11/1930 United Kingdom ............... 74/594.4
   787651 12/1957 United Kingdom ................... 74/560

Primary Examiner—Kenneth Dorner
Attorney, Agent, or Firm—Stevens, Davis, Miller & Mosher

[57] ABSTRACT

A pedal for a bicycle, which supports a pedal body rotatably around the axis of a pedal shaft, the pedal body having a front foot-bearing surface and a rear foot-bearing surface, wich extend in parallel to the pedal body, and an outer connection connecting the front and rear foot-bearing surfaces at the lengthwise outer ends thereof, the foot and rear bearing surfaces each extending in parallel to the axis of the pedal shaft and being curved to have the center of curvature above the surface, so that the center of curvature of the rear foot-bearing surface is positioned axially outwardly of the pedal shaft with respect to the front foot-bearing surface.

7 Claims, 5 Drawing Figures

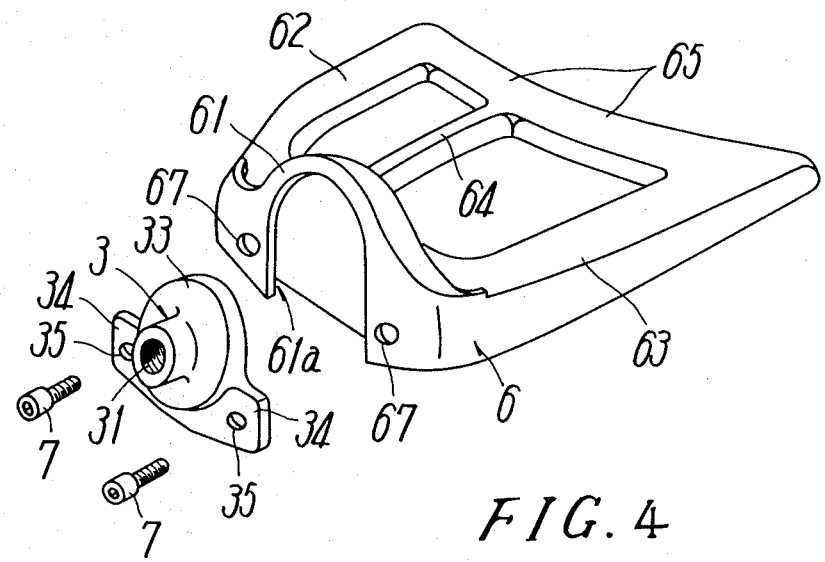
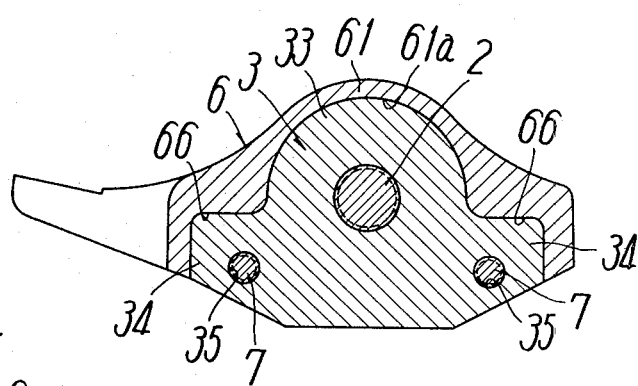
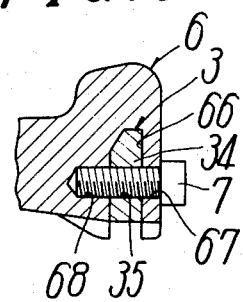

PEDAL FOR A BICYCLE

FIELD OF THE INVENTION

This invention relates to a pedal for a bicycle, and more particularly to a pedal having a pedal body supported on a pedal shaft rotatably around the axis thereof.

BACKGROUND OF THE INVENTION

Generally, various kinds of pedals, such as a rubber pedal or metallic rattrap type pedal, are well-known. The rattrap type pedal is used in a sports bicycle for cycle racing or cycle touring and has a pedal body comprising a pair of side plates between metallic inner and outer plates and a pedal shaft inserted into the inner and outer plates, the pedal body being supported on the pedal shaft through ball bearings, the side plates extending in parallel to the medal shaft. A front foot-bearing surface is provided at one side plate and a rear foot-bearing surface at the other.

The front and rear foot-bearing surfaces, which extend in parallel to the axis of the pedal shaft, are made flat, whereby a rider, when treading the front and rear foot-bearing surfaces, cannot fit the sole of his foot to just the foot-bearing surfaces. As a result, a treading force by his sole is transmitted to the pedal body resulting in poor transmitting efficiency.

The conventional pedal of the aforesaid type for a racing bicycle has been so constructed that the front and rear foot-bearing surfaces are curved to fit to just the sole of the rider's foot. The front and rear foot-bearing surfaces, however, are curved in equal radii of curvature, and do not mate with the sole of the rider's foot. Hence, the sole of the rider's foot, especially the toes thereof, do not just fit to the foot-bearing surfaces, whereby not only the treading force from the sole is not effectively transmitted to the pedal body but also the toes often are fatigued due to the concentration of a load applied locally to the toes.

SUMMARY OF THE INVENTION

The present invention was developed in order to solve the aforesaid problem created in the rattrap type pedal used mainly for a sports bicycle. An object of the invention is to provide a pedal for a bicycle, which has a rear foot-bearing surface just fitting with a central portion of the sole of a rider's foot and a front foot-bearing surface just fitting with the toes of the foot, thereby restricting the occurrence of a slip of the rider's foot forward and laterally outward of the pedal body, thus making the rider less fatigued.

After research into the conventional problem, the invention has found that the toes of a human foot are gradually larger in thickness and the treading force applied to the pedal by the foot becomes greater from the little toe toward the big toe, the treading force is about uniform at the middle portion of the sole, and the foot, when treading the pedal, is apt to slip forward and outward of the pedal body.

This invention has been designed taking note of the above matter. The pedal of the invention has a pedal body provided with a front foot-bearing surface and a rear foot-bearing surface, which are extending axially of a pedal shaft, and with an outer connection for connecting both the front and rear foot-bearing surfaces at the ends thereof axially outward of the pedal shaft. The front and rear foot-bearing surfaces are concave and each have the center of curvature above the surface. The center of curvature above the rear foot-bearing surface is positioned axially outwardly of the pedal shaft with respect to that above the front foot-bearing surface.

The front and rear foot-bearing surfaces constructed as foregoing, gently rise axially outwardly with respect to the pedal shaft, in which the front foot-bearing surface rises more than the rear foot-bearing surface so that a rider, when placing his foot on each foot-bearing surface, ensures that his toes just fit to the front foot-bearing surface and the middle of the sole of his foot to the rear one, and also prevents a slip of his foot on the pedal.

Radii of curvature at the front and rear foot-bearing surfaces of the pedal of this invention are preferably equal, but a slight difference in the radii is allowable.

The outer connection is enough to connect the front and rear foot-bearing surfaces at the lengthwise outer ends thereof, which preferably has a concave surface.

In addition, a pedal body constructed to be integral with the pedal shaft is included in this invention, but it is preferable to separate the pedal shaft from the pedal body and connect them by connecting means.

BRIEF DESCRIPTION OF THE DRAWINGS

FIG. 3 is a perspective exploded view of parts of the pedal,

FIG. 4 is a sectional view taken on the line IV—IV in FIG. 1, and

FIG. 5 is a sectional view taken on the line V—V in FIG. 4.

DETAILED DESCRIPTION OF THE INVENTION

Figure 1:
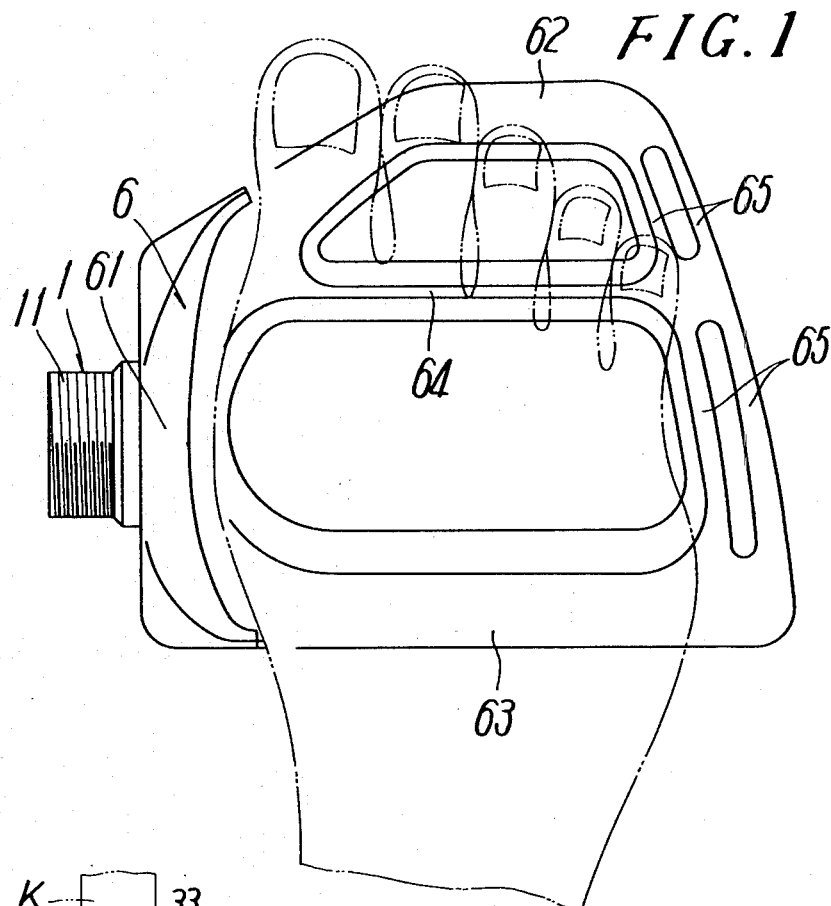
FIG. 1 is a plan view of a typical embodiment of a pedal of the invention.

A pedal shown in the drawings is attached to the right side of the bicycle. In the drawings, reference numeral 1 designates a fixing cylinder for supporting a pedal shaft 2 to a right side crank arm K at the gear crank means of the bicycle. The fixing cylinder 1 is provided at the outer periphery of its one axial end with a screw thread 11 and at the inner peripheries of both axial ends with ball races 12 and 13 so that the screw thread 11 is screwed with a threaded bore formed at the utmost end of crank arm K which carries the pedal, thereby fixing the fixing cylinder 1 to the crank arm K. The pedal shaft 2 is supported rotatably to the fixing cylinder 1 through pairs of balls 4 and 5. At one axial end (at the left side in FIG. 2) of pedal shaft 2 is provided a ball race 21 opposite to a ball race 12 at the fixing cylinder 1 and at the outer periphery of the other axial end is provided a screw thread 22, the screw thread 22 screwably supporting a ball holder 3.

The ball holder 3 is frusto-conical and provided at the inner periphery with a screw thread 31 screwable with the screw thread 22 at the pedal shaft 2 and at the outer periphery of one axial end with a ball race 32 opposite to the ball race 13 at the fixing cylinder 1. Balls 4 are interposed between the ball race 12 at the fixing cylinder 1 and the ball race 21 at the pedal shaft 2, and ball 5 between the ball race 13 at the fixing cylinder 1 and the ball race 32 at the ball holder 3, so that the pedal shaft 2 is supported rotatably to the fixing cylinder 1.

The ball holder 3 also is provided at the outer periphery of one axial end and axially outwardly from the ball race 32 with a flange 33 projecting radially outwardly of the ball holder 3, the flange 33 being fit to a pedal body 6.

The pedal body 6 is separate from the pedal shaft 2 and has; a front foot-bearing surface 62; a rear foot-bearing surface 63; an intermediate foot-bearing surface 64, which are extending in parallel to the axis of pedal shaft 2; an outer connection 65 for connecting the front, rear and intermediate foot-bearing surfaces 62, 63 and 64 at the lengthwise outer ends thereof; and an inner connection 61 connecting these foot-bearing surfaces 62, 63 and 64 at the lengthwise inner ends thereof; the inner connection 61 having a groove 61a engageable with the flange 33.

Figure 2:
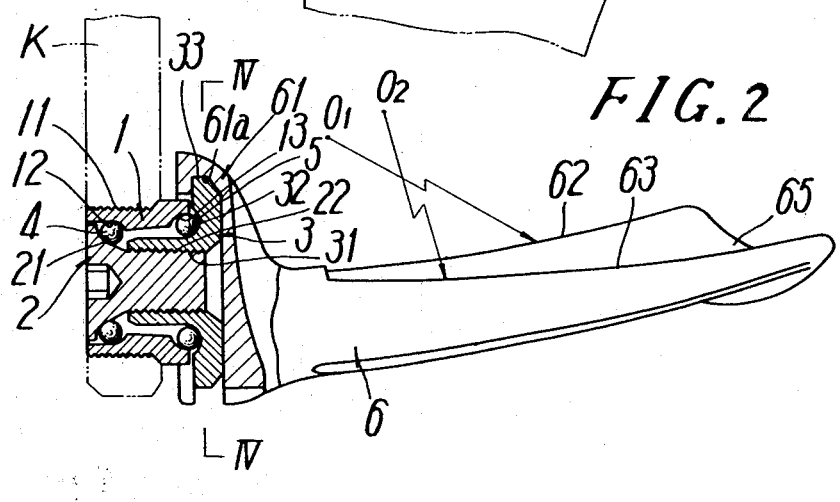
FIG. 2 is a partially cutway rear view.

The respective foot-bearing surfaces 62, 63 and 64 are concave and have the center of curvature positioned above the surface. The center $O_2$ of curvature at the rear foot-bearing surface 63, as shown in FIG. 2, is positioned axially outwardly of the pedal shaft 2, i.e., at the side of outer connection 65, with respect to the center $O_1$ of curvature at the front foot-bearing surface 62. Radii of curvature at these foot-bearing surfaces 62,63 and 64 are made equal. The rear foot-bearing surface 63 is gently downwardly slanted with respect to the horizontal plane parallel to the pedal shaft 2 and rises gradually lengthwise outwardly of the surface 63. The front foot-bearing surface 62 is sharply downwardly slanted with respect to the aforesaid horizontal plane and rises gradually lengthwise outwardly of the surface 62 higher than the rear foot-bearing surface 63. In addition, a slight difference in the radii of curvature of these foot-bearing surfaces 62,63 and 64 will be allowable. Hence, a rider, when putting the sole of his foot on the front and rear foot-bearing surfaces 62 and 63, can fit the middle of the sole of his foot to just the rear foot-bearing surface 63 and the toes of his foot to just the front foot-bearing surface 62. Furthermore, the front foot-bearing surface 62 is rising outwardly higher than the rear surface 63 to thereby restrict his foot on the foot-bearing surfaces 62, 63 and 64 from slipping forward of the pedal body 6. Also, the outwardly rising foot-bearing surfaces 62 and 63 can restrict his foot from slipping sideways outwardly of the pedal body 6. In addition, it is preferable to make concave the upper surface of outer connection 65 as shown in FIG. 3.

The inner connection 61 is swollen upwardly with respect to the foot-bearing surfaces 62, 63 and 64 and recessed at the side opposite to the crank arm K, thereby forming the groove 61a which is open as shown in FIG. 3. The flange 33 is inserted into the groove 61a to engage at the outer periphery with the innermost portion of groove 61a to be fit to the inner connection 61. In order to keep the fitting, the inner connection 61 may be elastically deformed to use its elastical restoring force, or a fixture, such as a bolt, may be used. When using the bolt, the flange 33, as shown in FIGS. 3 through 5, is provided with two lugs 34 extending radially outwardly from the flange 33, the lugs 34 having respective through bores 35. At both sides of the lower portion of inner connection 61 are formed grooves 66 for receiving therein the lugs 34. The grooves 66, as shown in FIG. 5, are provided with through bores 67 and threaded bores 68 so that fixtures 7 are inserted through the bores 67 and 35 and screwed with the threaded bores 68 respectively, thereby connecting the ball holder 3 to the pedal body 6, thus keeping the flange 33 fitting with the inner connection 61. Incidentally, the fixtures 7, other than the bolts as shown, may be pins.

The pedal of the invention constructed as foregoing is trod by the rider in such a manner that he places the middle of the sole of his foot in contact with the rear foot-bearing surface and the toes on the front foot-bearing surface, in which the front and rear foot-bearing surfaces are constructed as aforesaid, to just fit the toes and sole middle portion respectively. The occurrence of a slip of his foot forward or outward of the pedal body 6 is reduced with this construction.

As clearly understood from the above description, the pedal of this invention is so constructed that the front and rear foot-bearing surfaces of the pedal body are lengthwise concave and the center of curvature of the rear foot-bearing surface is positioned axially outwardly of the pedal shaft with respect to the center of curvature of the front foot-bearing surface, whereby the rider can just fit the middle of the sole of his foot to the rear foot-bearing surface and the toes of his foot to the front foot-bearing surface and a slip of his foot created forward and outward of the pedal body when pedalling is reduced.

Hence, the rider not only can transmit his treading force effectively to the pedal body through the sole of his foot but also is subjected to a distributed load on his toes, thereby being relieved from local fatigue. Since the front foot-bearing surface is concave and slanted more sharply than the rear foot-bearing surface and rises lengthwise outwardly higher than the same, the sole of the rider's foot is prevented from slipping forward of the pedal body. Also, both the front and rear foot-bearing surfaces, which rise lengthwise outwardly, prevent the sole of his foot from slipping off the pedal body axially outwardly of the pedal shaft.

While a preferred embodiment of the invention has been described using specific terms, such description is for illustrative purpose only, and it is to be understood that changes and variations may be made without departing from the spirit or scope of the following claims.

What is claimed is:

1. A pedal for a bicycle, comprising a pedal shaft and a pedal body supported on said pedal shaft in rotatable relationship around the axis of said pedal shaft, said pedal body having a front foot-bearing surface and a rear foot-bearing surface, which extend in parallel to the axis of said pedal shaft, and an outer connecting portion which connects said front and rear foot-bearing surfaces at lengthwise outer ends thereof and extends longitudinally of said pedal body, both said front and rear foot-bearing surfaces being curved to have the centers of curvature above said surfaces respectively, said center of curvature of said rear foot-bearing surface being positioned axially outwardly of said pedal shaft with respect to the center of curvature of said front foot-bearing surface.

2. A pedal for a bicycle according to claim 1, wherein said pedal body has an intermediate foot-bearing surface, said intermediate foot-bearing surface being provided at a substantially intermediate portion between said front and rear foot-bearing surfaces, positioned in proximity to said foot-bearing surface, and extending in parallel to each of said front and rear foot-bearing surfaces.

3. A pedal for a bicycle according to claim 1, wherein said front foot-bearing surface has a radius of curvature equal to that of said rear foot-bearing surface.

4. A pedal for a bicycle according to claim 1, wherein said pedal shaft has a fixing cylinder and a pair of bearing members, said bearing members being interposed between the outer periphery of said pedal shaft and the inner periphery of said fixing cylinder at a fixed interval, said pedal shaft being supported rotatably to said fixing cylinder.

5. A pedal for a bicycle according to claim 4, wherein said pedal shaft is provided with a bearing surface for sustaining one of said bearing members and with a bearing cone having a bearing surface for sustaining the other, said bearing cone having a mounting portion for said pedal body.

6. A pedal for a bicycle according to claim 5, wherein said mounting portion at said bearing cone comprises a flange extending radially outwardly of said bearing cone, said pedal body having an inner connecting portion connecting said front and rear foot-bearing surfaces at the lengthwise inner ends thereof, said inner connecting portion having an engaging groove with which said flange is insertably engageable.

7. A pedal for a bicycle according to claim 6, wherein said flange has at its lower portion a pair of lugs extending radially outwardly of said flange, said engaging groove at said inner connecting portion provided at said pedal body having receiving grooves which are in continuation of said engaging groove and receive said lugs respectively, said lugs being fixed to a wall of said inner connecting portion through fixing means.

* * * * *